Oct. 19, 1965 J. J. HRONAS 3,212,677
APPARATUS AND METHOD FOR VERY SLOW LIQUID FLOW RATES
Filed Aug. 8, 1962 3 Sheets-Sheet 3

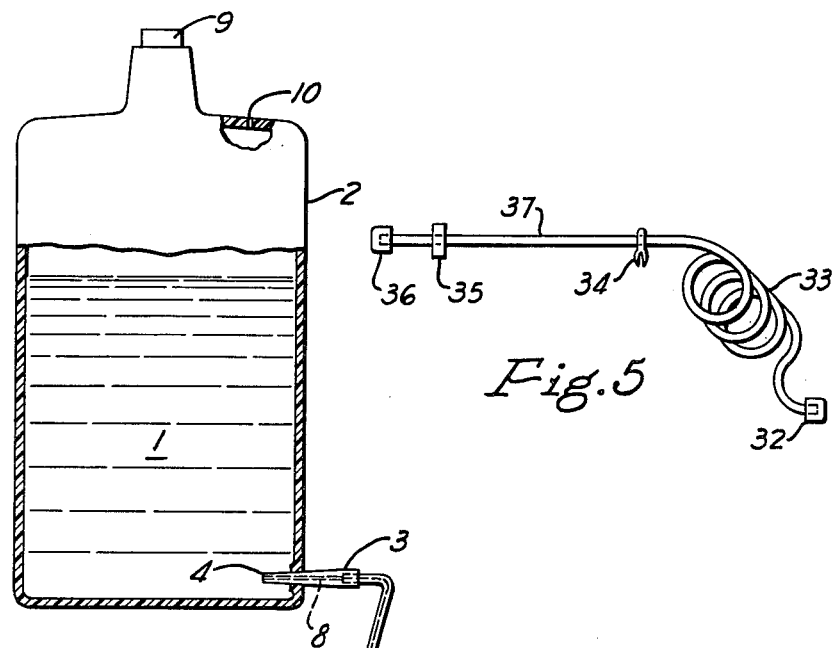
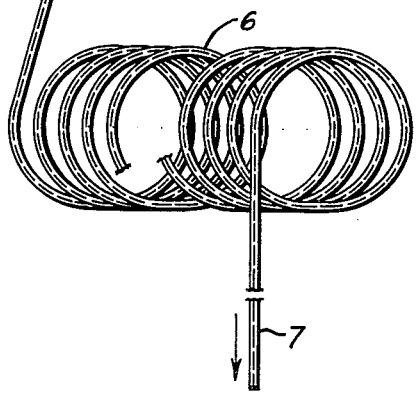
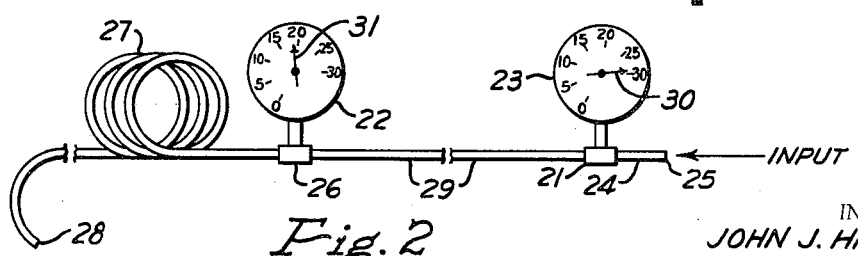
Oct. 19, 1965 J. J. HRONAS 3,212,677
APPARATUS AND METHOD FOR VERY SLOW LIQUID FLOW RATES
Filed Aug. 8, 1962 3 Sheets-Sheet 1
Fig.1
Fig.2
Fig.5
INVENTOR.
JOHN J. HRONAS
BY William T. Krayer
ATTORNEY.

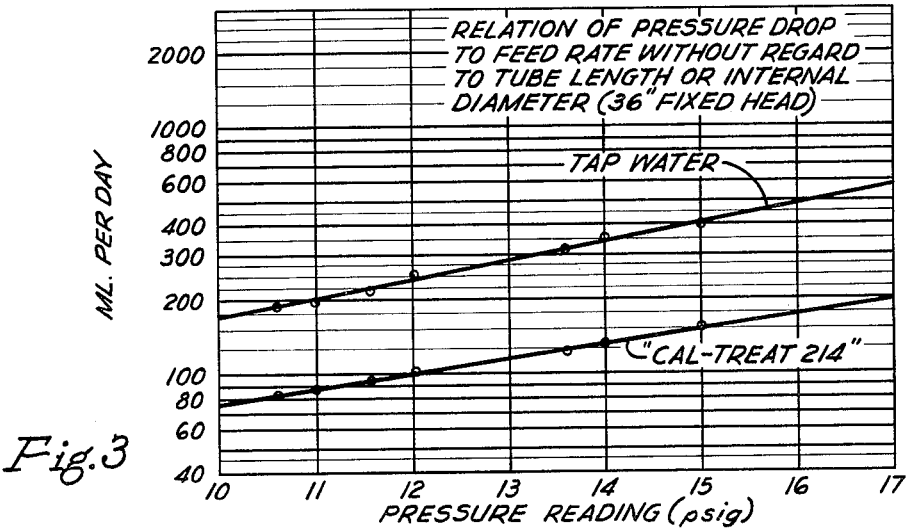
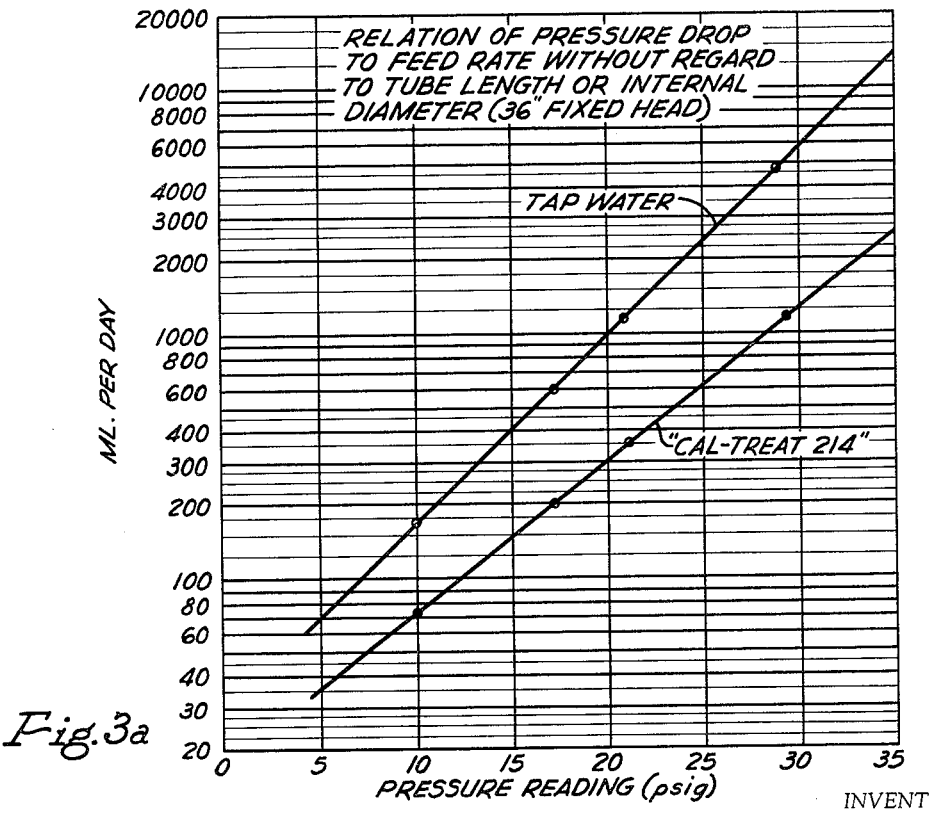

INVENTOR.
JOHN J. HRONAS
BY
ATTORNEY.

3,212,677
APPARATUS AND METHOD FOR VERY SLOW
LIQUID FLOW RATES
John J. Hronas, Greentree, Pa., assignor to Calgon
Corporation, a corporation of Pennsylvania
Filed Aug. 8, 1962, Ser. No. 215,701
1 Claim. (Cl. 222—81)

This invention relates to feeders or dispensers of liquid in small volumes at slow rates and over long periods of time.

Prior to the present invention, the continuous feeding of liquids at very slow rates involved the use of elaborate and expensive equipment. Timers and/or pumps, for example, must be specially designed to achieve the slow rates usable for feeding corrosion inhibitors, biocides, scale inhibitors and the like into industrial and commercial water systems. Indeed, a pump which is free of the hazards of breakdown, which does not require electricity or other power, which can be operated with virtually no supervision, which is of really simple design and yet which will deliver only a few milliliters per minute or perhaps 10 milliliters a day at an even rate is difficult to conceive.

I have invented a device which will deliver liquids at extremely slow feed rates with virtually no complications since it involves no moving parts. My invention utilizes a capillary tube of extraordinary length. There need be no valves, stopcocks, timers, or other adjustments.

In addition to feeding liquids such as scale inhibitors, biocides, corrosion inhibitors and similar industrial liquids, my invention may be used to feed water and/or liquid fertilizer or the like to plants at continuous slow rates. The source of water for such uses of my invention need not be a stationary container, but can be a flowing source such as a pipe, plastic tube, or open channel.

The presently preferred version will be discussed with reference to the accompanying drawings.

FIGURE 1 is a more or less diagrammatic illustration of the presently preferred system.

FIG. 2 is an illustration of a method of calibrating capillary tubes which simplifies manufacture of my invention.

FIG. 3 is a graph showing the relation between air pressure drop in a length of capillary tube and its ability to dispense liquid at an even rate.

FIG. 3a is a graph of the same factors in a different range.

FIG. 5 is an illustration of a tube as it could be utilized in a variation of my method invention for siphoning at very slow rates.

Figure 4:
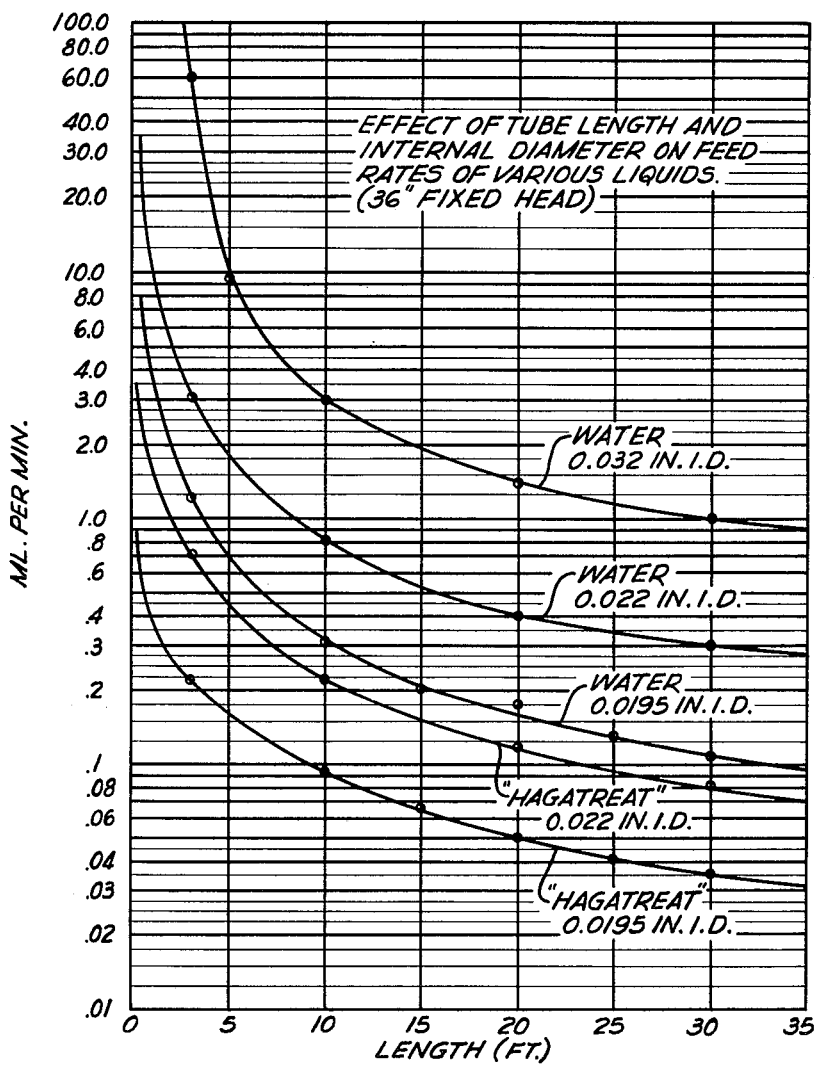
FIG. 4 is a graph showing the effect on feed rates of internal diameter and length of tubing.

Referring to FIG. 1, a plastic container 2 containing a liquid 1 to be dispensed is punctured near the bottom thereof by a metal probe 3 having a bore 8 therethrough and a relatively sharp tip 4. In the exterior end of probe 3 is inserted a polyethylene capillary tube 5, which is continuous and which may be formed into a coil 6. If no siphoning action is used, the full length of tube 7 is preferably kept below the level of liquid 1. Closure 9 of container 2 is preferably left slightly open or a hole 10 is punched in the top of container 2 to permit air to enter to replace dispensed liquid.

The capillary tube 5 should be at least two feet long and preferably will have an average internal diameter of about 0.01 inch to about 0.032 inch, but may be up to about 0.2 inch and as little as 0.01 inch I.D. The preferred tubing is made of polyethylene and may be purchased in 3000 ft. rolls, and has an internal diameter of 0.022"±0.001" and an outer diameter of 0.114". Very slow feed rates can be obtained by the use of very long capillary tubes, for example on the order of 100 feet. Conversely, more rapid flow rates can be obtained with lengths as little as 2 to 4 feet. The diameter of the coil 6 also affects the flow rate. Generally speaking, the smaller the diameter of the coil, the lower the flow rate.

A small weight may be attached to the end of the tubing remote from the probe 3 as is illustrated in FIGURE 5 of the drawings.

I employ a unique method of determining the exact length of capillary tubing needed to achieve a desired feed rate of a given liquid. My method involves the use of air pressure and means for measuring the air pressure drop in a capillary tube. As can be seen in FIG. 2, a capillary tube 29 slightly longer than will presumably possess the desired delivery rate is attached at 20 and 21 to pressure gauges 22 and 23 respectively. Beyond gauge 23 is a short length of tubing 24 having means for receiving an input pressure at 25. The input pressure in this case is 29.75 as indicated on gauge 23. On the downstream end, a length of capillary tube 27 is attached at 26 to the gauge and the main line 29. The end 28 of tube 27 is left open. To test the ability of capillary tube 29 to feed a particular solution or other liquid at a desired rate for a known "head" (vertical distance from the liquid source level to the lower end), a known air pressure is introduced at point 25 and a reading is taken on gauge 23. Another reading is then taken on gauge 22, while end 28 of tube 27 is permitted to remain open. The pressure drop (difference between the readings of gauges 23 and 22) is then compared to the air pressure drop previously taken on a length of tube known to deliver at the desired rate. A proportionate length of tube 29 is then cut off, and the remaining major length of tube 29 is kept for use without the necessity for further testing.

The air pressure drop may be used as a calibration and/or standardization reference for calculating feed rates of fluids of various viscosities and under various pressure differences. The "head," or height of the column of liquid, and the force of gravity may be considered equivalent to a pressure difference throughout this specification. My invention contemplates the use of capillaries for regulating the flow of liquid where artificially-created pressure differences are the cause of flow, including very great pressure differences. It is not necessary to know the length of a tube or even the diameter to obtain a standard reference for flow rate. To obtain the desired flow rate, the proper pressure difference is used on a tube of known air pressure drop.

I prefer to perform the air pressure drop calibration on capillary tubes formed into a more or less permanent coil having a foot or two (if possible) of free end on each end. In this manner, variations due to coiling are eliminated. I prefer to use coils of about 3" diameter secured roughly in toroidal form by common adhesive tape.

That the air pressure drop as calculated above is related to the feed rate is shown by the graph in FIG. 3. To arrive at the data plotted in FIG. 3, various lengths of tubing of approximately the same internal diameter were used. They were formed into coils of about 3" diameter. A pressure of 29.7 p.s.i.g. was introduced into one end and another pressure reading taken at the other end. The downstream pressure reading is plotted on the X-axis and milliliters per day of liquid delivered by the tube still coiled in the same manner through a 36" head is plotted on the logarithmic Y-axis. It will be noted that the two liquids used, tap water and a 50% aqueous solution of the corrosion inhibitor "Cal Treat 214," present linear patterns on the logarithmic scale, showing a clear mathematical relationship between the air pressure drop and the number of milliliters delivered per day for any given head. This relationship holds true for any given tolerance of internal diameter; that is, it is a function of the integral of the internal volume of the tube.

An expanded range of data on the same factors obtained in the same manner is shown in FIG. 3a.

The table lists downstream end pressure readings for various lengths of .022″ I.D. tubing having a manufacturer's tolerance of 0.001″. As explained above, a pressure of 29.7 p.s.i.g. was introduced to the upstream end. It is apparent that the feed rate of a tube of given length is predictable. It is also apparent that my invention operates independently of so-called "capillary action." That is, my invention does not rely on the ability of a capillary tube to cause liquid to rise within it.

Table

| Length: | Downstream end pressure reading |
|---|---|
| 19.5′ | 13.6 |
| 20′ | 13.25 |
| 22′ | 12.50 |
| 24′ | 12.02 |
| 26′ | 11.55 |
| 28′ | 11.0 |
| 30′ | 10.60 |
| 66′ | 6.6 |
| 107′ | 4.2 |

It will be seen from FIG. 4 that the feed rate of tap water is readily correlated to the internal diameter and length of tubing. In FIG. 4, the feed rates of tap water and a 50% solution of a corrosion inhibitor, "Hagatreat 168" in a system similar to that illustrated in FIG. 1, in which the vertical distance from the highest point of the tube 3 to its lower end (fixed head) was 36 inches, is plotted on the left side of the logarithmic scale and the various lengths are plotted on the X-axis. Internal diameters (I.D.) and the particular liquids used in each test are indicated on the plotted lines. The curves continue asymptotically towards a flow rate of zero for longer tube lengths. A 100′ length of .022 (I.D.) tubing will deliver 20 ml. per day of water under the same conditions as in FIG. 4.

My invention may be embodied in various ways. For example, the capillary tube may be pre-inserted through the bottle wall without the necessity for the metal probe. That is, the bottle may be manufactured with an orifice or other device suitable to accommodate the capillary tube and establish communication with the interior. The tube should be capped when a filled container is sold with the tube already inserted, unless the tube end can be held higher than the liquid level. The feeder may be sold, for example, with the tube already inserted and the coil of the tube encircling the neck of the bottle. Another variation is the tube shown in FIG. 5. In FIG. 5, a capillary tube 37 is shown ready for shipment. The tube 37 includes a coil 33. It is filled with the solution it will be feeding in operation. The solution is held in the tube by caps 36 and 32 at each end. Plastic clip 34 is placed on tube 37 about the same distance from end 36 of the tube as the height of the bottle for which it is intended. An optional weight 35 is attached near end 36. To place this variation in operation, the user simply removes cap 36, places the now open end in the solution container, clips the tube in place by using clip 34, preferably on the lip of the container opening, allows the coil to dangle below the container, and removes cap 32 on the far end of the tube. The device will now siphon the solution at a predetermined rate depending on the distance from the liquid level in the container to the lower or free end of the tube. The clip is optional and may be attached separately. It is not necessary to puncture the container. This variation has the additional advantage that the container closure will not inadvertently be left airtight.

The liquid may also be siphoned from the bottle with a capillary tube without the necessity of using a pre-filled capillary tube as in FIG. 5. This method of dispensing liquids at even rates constitutes a method within the scope of the present invention. The method may be described as a method of dispensing liquid from a container thereof comprising inserting an end of a rigid or flexible capillary tube at least three feet long into the liquid through the top of said container, lowering the other end of the tube below the surface of said liquid, and causing a flow of liquid to begin throughout the length of said tubing.

So far as I am aware, there is no maximum length of tubing which may be used in my invention, although practical uses for extremely slow feed rates are rare.

I do not intend to be restricted to the specific examples and embodiments with which my invention is explained herein. It may be otherwise variously practiced and embodied within the scope of the following claim.

I claim:

Apparatus for slowly dispensing liquid comprising (a) a puncturable liquid container, (b) a capillary tube at least two feet in length, and (c) a rigid probe having a bore therethrough, one end of which probe is adapted to penetrate through the wall of said container and the other end of which includes means for receiving an end of said capillary tube, whereby, when said tube is connected to said probe and said probe is inserted through the wall of the puncturable container, communication is established between the interior of said liquid container and the far end of said tube, said tube having a weight attached thereto adjacent said far end and being coiled intermediate the ends.

References Cited by the Examiner

UNITED STATES PATENTS

| 57,256 | 8/66 | Meglone | 222—81 |
|---|---|---|---|
| 1,254,115 | 1/18 | Brand. | |
| 1,306,657 | 6/19 | Dezendorf | 73—3 |
| 1,396,817 | 11/21 | Dezendorf | 73—3 |
| 1,806,363 | 5/31 | Narbo | 222—81 |
| 1,919,500 | 7/33 | Carpenter | 62—511 |
| 2,434,118 | 1/48 | Newman | 138—44 X |
| 2,530,583 | 11/50 | Nurkiewicz | 222—394 X |
| 2,656,070 | 10/53 | Linder | 222—420 X |
| 2,732,099 | 1/56 | Davis | 222—1 |
| 2,745,572 | 5/56 | Talbot | 222—1 |
| 2,751,072 | 6/56 | Ditmar. | |
| 2,789,734 | 4/57 | Biederman | 222—420 X |
| 2,792,976 | 5/57 | Stewart | 222—530 X |
| 2,865,592 | 12/58 | Schrank | 251—118 X |
| 2,986,142 | 5/61 | Bieberdorf et al. | |
| 3,057,169 | 10/62 | Jacobs | 62—511 X |
| 3,085,364 | 4/63 | Chapin. | |
| 3,108,717 | 10/63 | Kindseth. | |

FOREIGN PATENTS

| 600,364 | 7/34 | Germany. |
|---|---|---|
| 830,222 | 3/60 | Great Britain. |

OTHER REFERENCES

Reference "A": Article, A. E. Staebler, Journal of the ASRE, issue of January 1948, page 55, left column, first paragraph under heading "Advantages of a Capillary."

RAPHAEL M. LUPO, *Primary Examiner.*